United States Patent
Wilson

(10) Patent No.: US 6,218,870 B1
(45) Date of Patent: Apr. 17, 2001

(54) ANTI-GLITCH SYSTEM AND METHOD FOR LASER INTERFEROMETERS USING FREQUENCY DEPENDENT HYSTERESIS

(75) Inventor: Robert L Wilson, Los Gatos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/388,111

(22) Filed: Sep. 1, 1999

(51) Int. Cl.$^7$ .................................................. H03K 5/1536

(52) U.S. Cl. .................................. 327/34; 327/77; 327/89

(58) Field of Search ................................... 327/34, 37, 77, 327/78, 79, 80, 74, 75, 76, 176, 205

(56) References Cited

U.S. PATENT DOCUMENTS

| | | | |
|---|---|---|---|
| 4,529,892 | * 7/1985 | Reilly et al. | 327/75 |
| 5,278,462 | * 1/1994 | Wilson | 327/79 |
| 5,498,985 | * 3/1996 | Parle et al. | 327/74 |
| 5,514,987 | * 5/1996 | Ramirez | 327/74 |
| 5,530,542 | 6/1996 | Kalem | 356/345 |
| 6,091,239 | * 7/2000 | Vig et al. | 324/207.2 |

OTHER PUBLICATIONS

Hewlett–Packard Company, "High Performance Laser Interferometer Positioning for VMEbus Systems", Product Overview, Aug. 1996, pp. 1–11.

Hewlett–Packard Company, Operating Manual, "HP E 1707A Dynamic Receiver" "HP E 1708A Remote Dynamic Receiver", Jul. 1997.

* cited by examiner

Primary Examiner—Tuan T. Lam
(74) Attorney, Agent, or Firm—James C. Pintner

(57) ABSTRACT

Circuitry is provided for detecting threshold crossings of an input signal which is generally sinusoidal or otherwise periodic, but which is subject to either high-frequency noise which would cause erroneous multiple threshold crossings, or low-frequency noise which would cause erroneous failure to detect a threshold crossing. Two detection elements detect the crossing of two different threshold values and produce detection signals reflecting whether the input signal is above or below their thresholds. For noisy input signals, these detection signals may be bouncy. High- and low-true versions of the detection signals are logically combined to produce a first signal which is active only while the input signal moves in one direction, and is masked from the active state while the input signal moves in the other direction. Likewise, a second signal is produced which is active the opposite way. The first and second signals set and reset a latch, whose output state represents the threshold crossing. Because of the logic masking of activity on the second signal due to noise on the input signal, once the first signal puts the latch in one state, the latch is not immediately put back to the other state by the second signal. Rather, the latch remains in the one state until the input signal changes direction, at which time the first signal is masked but the second signal is enabled. Hysteresis circuitry allows the two detection elements to operate on different threshold values. Also, low-frequency noise is reduced by making the hysteresis circuitry frequency dependent. Preferably, the circuitry is low-pass, so that the hysteresis effect is reduced for higher-frequency input signals affected by lower frequency noise.

11 Claims, 9 Drawing Sheets

ANTI-GLITCH SYSTEM AND METHOD FOR LASER INTERFEROMETERS USING FREQUENCY DEPENDENT HYSTERESIS

FIELD OF THE INVENTION

The invention generally relates to the field of precision measurements. More specifically, the invention relates to laser interferometer measurement systems which measure by detecting zero crossings of low intensity signals, while minimizing the effects of noise. The invention has particular applicability to the field of integrated circuit (IC) fabrication.

BACKGROUND OF THE INVENTION

A laser interferometer is a measuring tool that uses wavelengths of a periodic phenomenon, such as laser light, for accurately measuring distances. An interferometer includes one or more receivers for detecting characteristics of the light, such as the phase of the light waves. In particular, counting cycles of the light wave plays an important role in the measurement.

Noise can cause an error in the cycle count. Such an error is also referred to as a "Glitch". Glitches are undesirable, because they reduce the accuracy of the measurement being taken. Therefore, it is an important objective of interferometer measurement system designers to eliminate or minimize glitches. This can be done by keeping the magnitude of the light high enough that the interferometer measurement is relatively insensitive to noise. However, other design considerations favor a reduced light magnitude.

A laser interferometer measurement system that reduces glitches would allow laser signals of smaller intensity to be used. Also, glitch reduction would result in more accurate and efficient positioning.

SUMMARY OF THE INVENTION

There is provided, in accordance with the invention, a circuit and method, for use with a laser interferometer measurement system, for receiving low intensity signals. The circuit and method employ hysteresis to reduce sensitivity to noise conditions which conventionally would result in glitches. Measurement error caused by glitches is advantageously reduced below that of conventional circuits and methods.

A circuit according to the invention includes inputs for receiving analog detection signals such as sinusoidal signals, and comparators for producing digital versions of the detection signals. The digital versions may bounce between high and low during transitional periods in which noise on the analog signal would cause glitches in the zero crossing detection In accordance with the invention, the inputs of the comparators have hysteresis circuitry which causes the signal transitions to take place at a phase of the analog signals which is displaced from the phase at which the signal actually crosses zero.

High- and low-true versions of the digital detection signals are logically combined to produce a first signal which is active only while the input signal moves in one direction, and is masked from the active state while the input signal moves in the other direction. Likewise, a second signal is produced which is active the opposite way. Because of the phase displacement resulting from the hysteresis circuitry, the logical combination as able to achieve this masking.

The first and second signals respectively set and reset a latch. The output state of the latch represents the threshold crossing. Because of the logic masking of activity on the second signal due to noise on the input signal, once the first signal puts the latch in one state, the latch is not immediately put back to the other state by the second signal. Rather, even if the input signals bounce because of the noisy threshold crossing, the latch remains in the one state until the input signal changes direction, at which time the first signal is masked but the second signal is enabled. Accordingly, the latch masks out the bouncing, which would be detected as erroneous zero crossings. The result is that clean transitions of the first and second signals are produced.

There are further provided a circuit and method as above, but further including circuitry for disabling the hysteresis functionality for frequencies above a threshold, where the hysteresis is not needed.

DETAILED DESCRIPTION OF THE PREFERRED EMBODIMENTS

LASER INTERFEROMETRY

Figure 1:
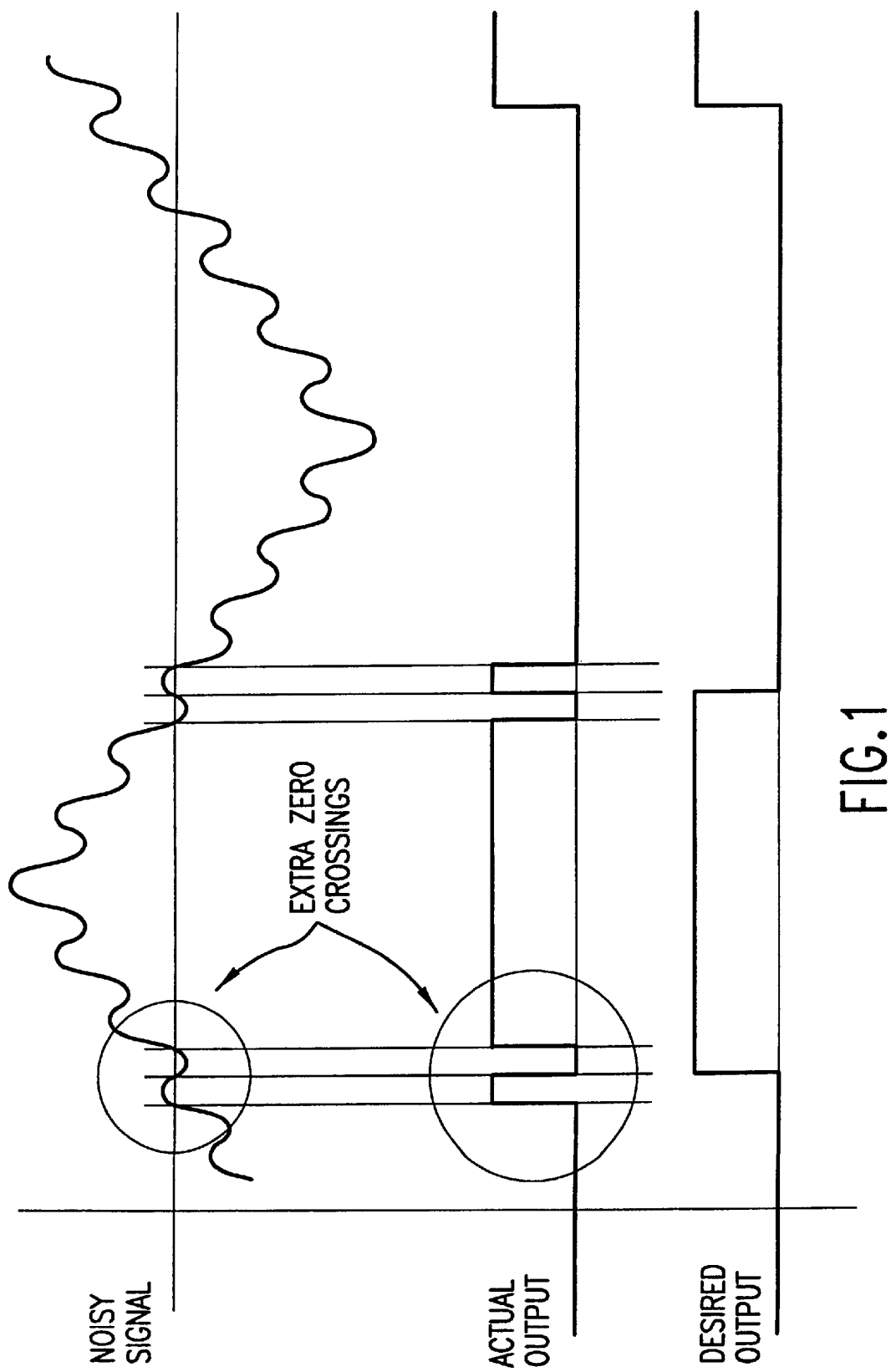
FIG. 1 is a timing diagram showing high-frequency noise on a lower frequency signal, causing extra zero crossings for a conventional system.

A laser interferometer measuring system is an apparatus for measuring distances, or more precisely, for measuring the difference in length between different paths. Laser light is directed over the paths. Laser light is monochromatic, that is, it has a sinusoidal shape and a fixed wavelength and fixed frequency. An interferometer makes measurements in terms of wavelengths of the laser light and phase differences between light beams.

Some lasers produce more than one wavelength simultaneously. Lasers which are used with interferometers in accordance with the invention herein described produce two different wavelengths, each coherent.

Visible light itself is of the order of terahertz (Thz), with corresponding wavelengths on the order of hundreds of nanometers (nm). Therefore, it will be understood that this wavelength difference, designated the "split frequency," is small, relative to the different light frequencies. The lasers are perceived visually as being of only a single color.

However, the wavelength difference is used, in accordance with known interferometry techniques, for measurement. In the discussion which follows, laser interferometer systems will be characterized in terms of the split frequency, i.e., the difference between the two wavelengths of laser light. The differences between these frequencies range from 100 kHz to 16 MHZ or higher. It will be seen that the performance of the various embodiments of the invention depends on the difference between the laser light wavelengths, and that one of the embodiments particularly addresses performance as a function of the wavelength difference.

DISTANCE MEASUREMENT USING A LASER INTERFEROMETER

A laser interferometer system can measure distances with a resolution on the order of 1 nm (nanometer). This is, in general, better resolution than that of other high precision measurement systems now available. Hewlett-Packard Company's HP E1717A Dynamic Receiver and HP E1708A Remote Dynamic Receiver are examples of commercially available laser interferometer measuring systems.

A laser interferometer measurement system includes a source of laser light, an optical interferometer, a reflector, a receiver, and some electronic circuitry.

With large laser measurement systems, it is common practice to split the laser light from one laser source into many beams. Thus, an interferometer system also generally includes one or more beam splitters, positioned in the path of incident laser beams, for directing the resultant split beams in different directions and along different paths.

The resultant split beams have the same wavelength or wavelengths as the incident beam, but lesser magnitudes. Numerous measurement beams may be used simultaneously, for instance to measure distances in three-dimensional space along multiple axes. One of the beams is used as a reference beam, and one or more other beams, used as measurement beams, are used to measure distances.

As the number of beams that are split from one source increase, the intensity of the measurement signal light received by the receiver decreases proportionately. Since the light intensity of the laser source is limited, the number of times that the light can be split from the source depends upon the sensitivity of the receiver.

In general, the distance to be measured is related to the position of a target. The reflector is associated with the target, so that a distance related to the target can be measured by directing a beam of laser light at the reflector. For instance, in IC fabrication, an interferometer may be used to position a piece of semiconductor material with reference to a projected photolithographic image, so that desired parts of the image line up accurately with landmarks on the semiconductor material.

A reference beam travels along a path having a known or controlled length. A measurement beam travels along a path whose length is related to the positioning of the reflector. A receiver is required for both the reference light beam and the measurement light beam. An interferometer measures by noting any phase difference between the received beams.

One or more conventionally known interferometer units are also provided. An interferometer unit receives an incident beam and splits the beam. For instance, where the beam is made up of two light components which are linearly polarized but at right angles to each other, the units splits the beam into portions according to their different polarization.

The interferometer unit directs a portion of the beam toward a target and a reflector. The interferometer unit then receives the beam, reflected back from the reflector associated with the target. Meanwhile, the other portion of the beam remains in the interferometer unit. For instance, the other portion of the beam is reflected by a reflector internal to the interferometer unit.

The interferometer unit then recombines the portions of the beam, and directs the recombined beam out, for instance toward a receiver.

Figure 7:
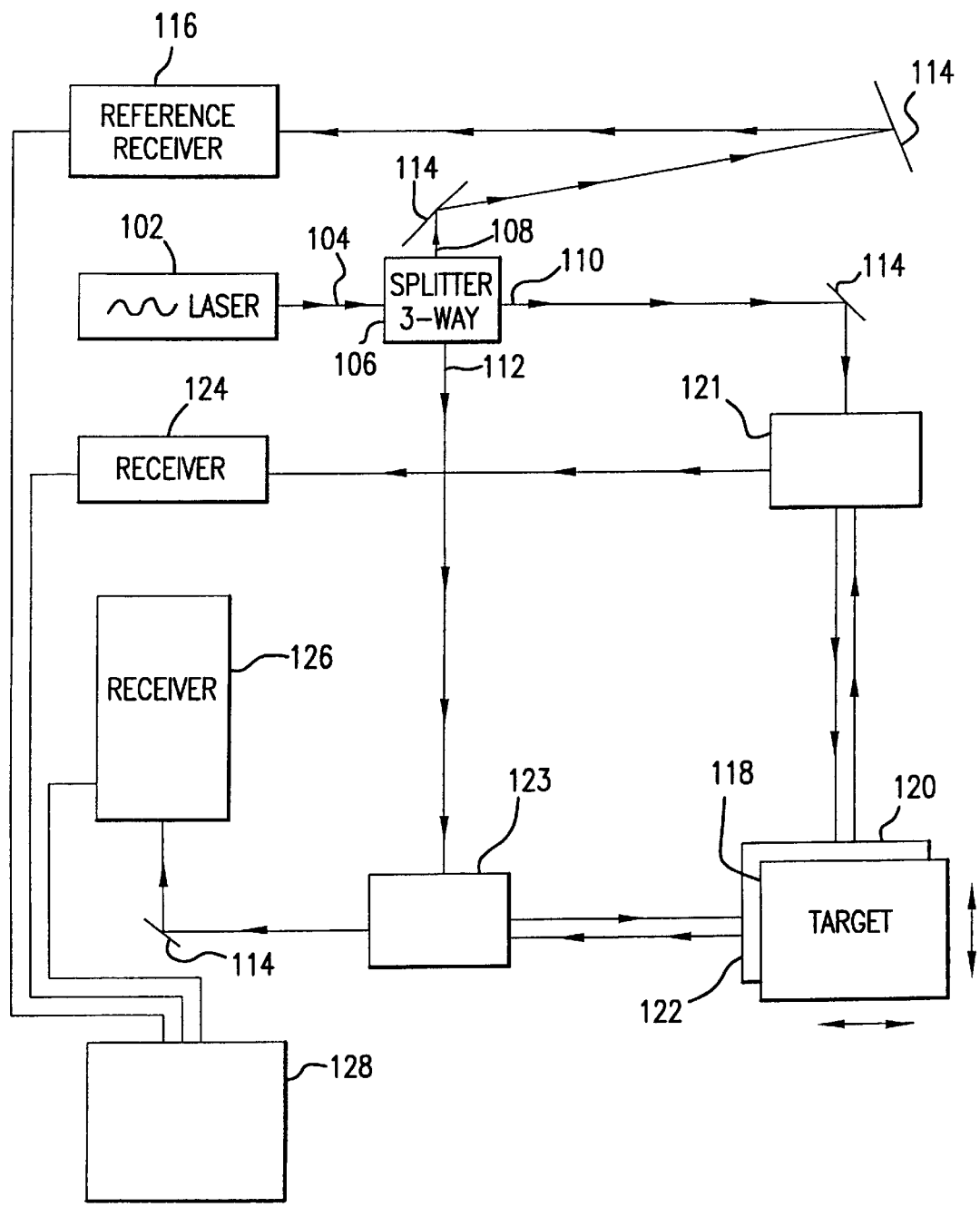
FIG. 7 is a system block diagram of a laser interferometer measurement.

An example of such a system is shown, in schematic block diagram form, in FIG. 7. Beams of laser light shown in FIG. 7 and described here, travel along paths in directions indicated by arrowheads.

A laser light source 102 directs a beam 104 to a splitter, shown for convenience as a three-way splitter 106, which produces beams 108, 110, and 112. Usually the beam is split within a laser head of the laser light source, and the reference receiver also is within the laser head. The reference signal, from the reference receiver, has a constant frequency.

The beams are directed along the respective paths by reflectors, all shown as 114. The beam 108 is a reference beam which travels a path of fixed, or controlled, length, to a reference receiver 116.

The beams 110 and 112 are measurement beams which are directed to a movable target 118. For illustrative purposes, the target 118 is translatable in two directions. Reflectors 120 and 122 are mounted on the target 118, facing along the two possible directions of movement. The beams 110 and 112 are directed at the reflectors 120 and 122, respectively, through interferometer units 121 and 123. The beams 110 and 112, after being reflected, are directed to receivers 124 and 126, respectively.

The interferometer units 121 and 123 and the receivers 116, 124, and 126 are shown schematically, but various known implementations will be familiar to persons skilled in the interferometry arts. For instance, implementations of the receivers 116, 124, and 126 may include optics for directing the reference beam 108 and one of the measurement beams to an eyepiece for allowing the operator to visually observe phase differences. Alternatively, they may include circuitry for making the measurements electronically. Where the receivers produce electrical signals from the received light beams, the electrical signals are also periodic.

While periodic electrical signals may be made sinusoidal as well, periodic electrical waveforms of other shapes may be used. In a preferred implementation, electrical square wave signals are produced. Regardless of the particular nature of the measurement which is made, a central measurement apparatus 128 receives the reference and measurement beams, or signals generated therefrom by the various receivers.

In accordance with the invention, the receivers 116, 124, and 126 and/or the receiver apparatus 128 are implemented as described below.

If the beams travel different distances, then the detector apparatus will, at any given point in time, observe a phase difference between the detected zero crossings. The receiver detects the phase angle between the reference beam and the measurement beam being studied. Phase differences are measured in degrees (360 degrees making up a full wavelength) or in radians ($2\pi$ radians making up a full wavelength). Observation of the phase difference may be done optically or electronically.

ZERO CROSSINGS; PERIODIC ELECTRICAL SIGNALS

For measurements where the measurement beam's path differs from the reference beam's path by more than one wavelength, the measurement beam's target must move from an initial position to the position from which the measurement is desired. The interferometer counts full wavelengths over the time the movement takes place. Therefore, a change in distance over time may accurately be measured in terms of full wavelengths.

The electrical signals have predetermined phase relationships with the light beams. Preferably, the light beams and the electrical signals vary plus and minus, at equal magnitudes, about an intermediate or threshold value such as zero, and the phase relationship is that they cross this intermediate value at the same time.

For a periodic phenomenon having values which vary over time, above and below the intermediate value, a "zero crossing" is defined, simply, as the crossing of the intermediate value.

Note that the term "zero crossing" is used for convenience and for easy comprehension, but is not limiting as to the threshold value. Rather, there can be any suitable threshold value, such as a value offset from zero by a constant value.

The zero crossings serve as phase reference points. For instance, a sine wave such as a beam of monochromatic laser light crosses zero at its 0° and 180° phases. Electrical square wave signals are well suited for this, because they change value sharply at well-defined phase angles. Where the average value of the electrical signal is made to be zero with the use of a high pass filter, the resulting electrical signal crosses zero every 180 degrees.

MEASUREMENT OF DISTANCES EXCEEDING ONE WAVELENGTH

One such sample, by itself, can only detect a difference in distance of up to one wavelength. To measure larger distances, and particularly to measure changes in distance that exceed one wavelength, there must be a way of measuring complete wavelengths. This is done by measuring over time and by keeping track of the zero crossings as the target and reflector are moved.

The frequency of the measurement signal changes with the velocity of the reflector. The frequency will Doppler shift up for a velocity in one direction and down for a velocity in the other direction.

Suppose, for instance, that over a given time interval, a target, within the path of the measurement signal, moves in such a way that the measurement light beam's path increases in length by 2.125 wavelengths. At the end of the motion, the one-eighth wavelength phase difference is detected as above. The two full wavelengths are detected because of a brief, Doppler-like increase in wavelength as the light beam travel path increases. Zero crossings are spaced a bit farther apart in time as the path length is increasing. The receiver detects four fewer zero crossings than would be the case if the path length had only increased by one-eighth wavelength. At two zero crossings per wavelength, the four missing crossings are detected as two wavelengths of distance. Similarly, if the path length decreases, a shortened Doppler wavelength, and extra zero crossings, are detected.

The circuitry accumulates the change in phase and the zero crossings, and converts this information into units of position.

When path length changes are determined from zero crossings, it is important that zero crossings be detected accurately. That is, when either signal crosses zero, it must do this only once—or at least that it must be counted only once.

A noise signal, added to the measurement signal, distorts a single zero crossing, to make it look like either more than one zero crossing, or a missing zero crossing. In either case, the extra zero crossing, or the missing zero crossing, is referred to as a "Glitch".

Extra Zero Crossing Glitch:

The "extra zero crossing" type of glitch occurs for the lower signal frequencies. This is because, at low frequencies, the slope of the signal at the zero crossing is relatively slow.

FIG. 1 is a timing diagram which illustrates such a noisy signal. The signal is a relatively low frequency sinusoid, and the noise is shown as a higher-frequency jitter superimposed on the sinusoid.

A comparator is used to produce a signal, called "actual output." The comparator receives the noisy input signal, and compares it with the reference threshold, such as a zero value.

If such high frequency noise voltage is present with the signal, at or near the zero crossing, then the noise perturbs the signal back across the zero crossing. Accordingly, extra zero crossings are detected.

Where the noise causes an extra zero crossing, a short spike appears as the actual output changes state. Preferably, an output signal should have no such transitional spikes, as shown by the signal labeled "desired output."

Missing Zero Crossing Glitch:

The second type of glitch occurs when a zero crossing is missing. This tends to happen when the split frequency of the input signal is above a threshold frequency, which has been observed to be approximately 2 MHZ. At these high signal frequencies, the slope of the sine wave, as it passes through zero, is quite high.

With a high signal zero-crossing slope, it is difficult for noise voltage to cause the slope to be non-monotonic. (The frequency content of the noise cannot be too much higher than the signal split frequency due to low pass filters at ~30 MHZ).

Figure 2:
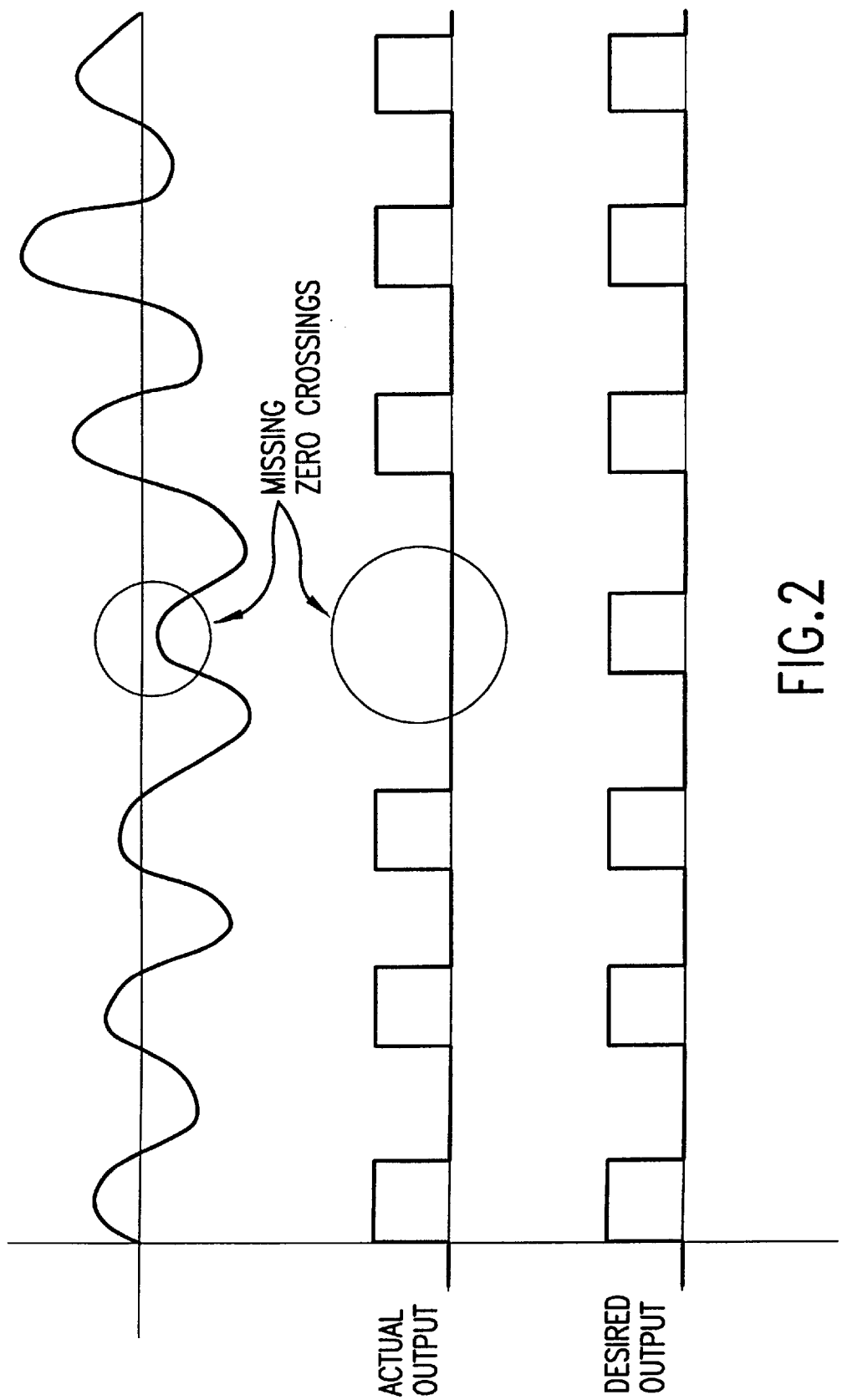
FIG. 2 is a timing diagram showing low-frequency noise on a higher frequency signal, causing missing zero crossings for a conventional system.

FIG. 2 is a timing diagram which illustrates such a noisy signal. The signal is a relatively high frequency sinusoid, and the noise is shown as a lower-frequency displacement, up and down, of the sinusoid. The noise thus adds to, or subtracts from, the signal waveform, causing the amplitude of the sine wave peaks to vary.

When the noise displaces the signal sinusoid from the zero crossing level, shown as an x-axis of the timing diagram, by a sufficient distance, a peak can be displaced so low, or a valley so high, that the signal doesn't cross zero. This results in missing zero crossings.

Either of the two types of glitches, the extra zero crossing and the missing zero crossing, will cause measurement errors. Over the time a target is moved and the measurement of the change in position is made, measurement errors accumulate, just as the correctly detected zero crossings accumulate. That is, over time, a succession of extra zero crossings, each one being detected as an extra full wavelength of measured movement, adds up to an accumulated error of many full wavelengths.

In this discussion, the term "zero crossing" will be used for the sake of ease of explanation and comprehension. However, it is also possible for the crossings described herein to take place with reference to other threshold values. Persons skilled in the circuit-design arts will be aware of design techniques, such as biasing or normalizing, which may cause the crossing event to be with reference to threshold values other than zero. Therefore, where the term "zero crossing" is used herein, it will nevertheless be understood that the broader concept of threshold crossing falls within the spirit and scope of the invention as described and claimed.

In general, the lower the magnitude of the light, the greater the susceptibility to noise errors. A laser interferometer measurement system that reduces detection of "false" zero crossings would allow laser signals of smaller intensity to be used.

A CONVENTIONAL APPROACH TO GLITCH ELIMINATION—U.S. Pat. No. 5,530,542

Kalem et al., U.S. Pat. No. 5,530,542, "Circuit and Method for Controlling Glitches in Low Intensity Signals," teaches the use of an integrator or differentiator for eliminating detection of false zero crossing glitches in the measurement signal of a laser interferometer measurement system.

It is well known that sinusoidal signals are phase-shifted by integration or differentiation. Integration and differentiation create waveforms offset by 90 degrees, forward or backward, respectively, from the original waveform.

The positive portion of the phase-shifted measurement signal is used to enable the detection of zero crossings in the falling portion of the measurement signal, while the negative portion of the shifted measurement signal is used to enable the detection of zero crossings in the rising portion of the measurement signal. Since integration and differentiation of a sinusoidal signal results in 90° phase shifts in opposite directions, either one, with inversion if necessary, can be used to produce an enable signal.

Each portion is compared to the reference signal by means of comparators. A set-reset (SR) latch receives the outputs of the comparators. Accordingly, the latch is set or reset based on the zero crossings of the measurement signal, without the effects of noise.

This approach works well, except that it has the drawback that its output level changes with the input frequency. In particular, as the frequency increases, the output level decreases, and becomes more susceptible to glitches produced by noise.

Accordingly, this prior art system, while reducing the first type of glitch (extra zero crossings), actually increases glitches of the second type (missing zero crossings). Because an integrator amplifies low frequencies more than high frequencies, it will amplify the low frequency content of the noise more than the high frequency noise. This causes the 90 degree offset voltages to have extra low frequency noise and hence the effectiveness of the anti-glitch circuit is reduced for the condition when the signal frequency is high.

A CONVENTIONAL HYSTERESIS CIRCUIT; FIGS. 3 AND 4

Figure 3:
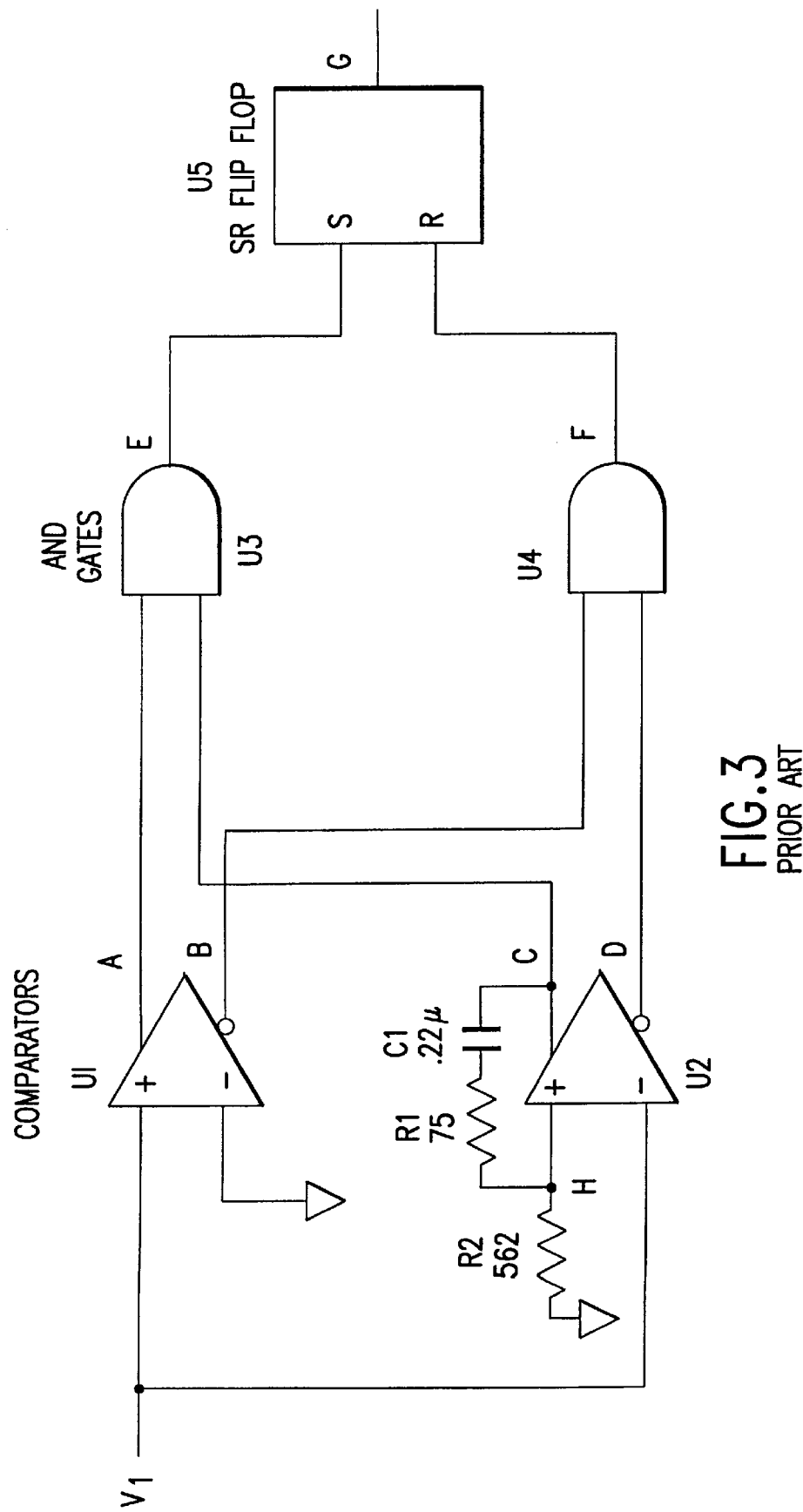
FIG. 3 is a schematic diagram of a conventional glitch control circuit.

FIG. 3 shows a block diagram of an anti-glitch circuit generally in accordance with the above-referenced Hewlett-Packard Company products. Hysteresis circuitry is used to create an offset waveform, which is then used to prevent extra zero crossings from showing up at the output of an RS Flip Flop.

Figure 4:
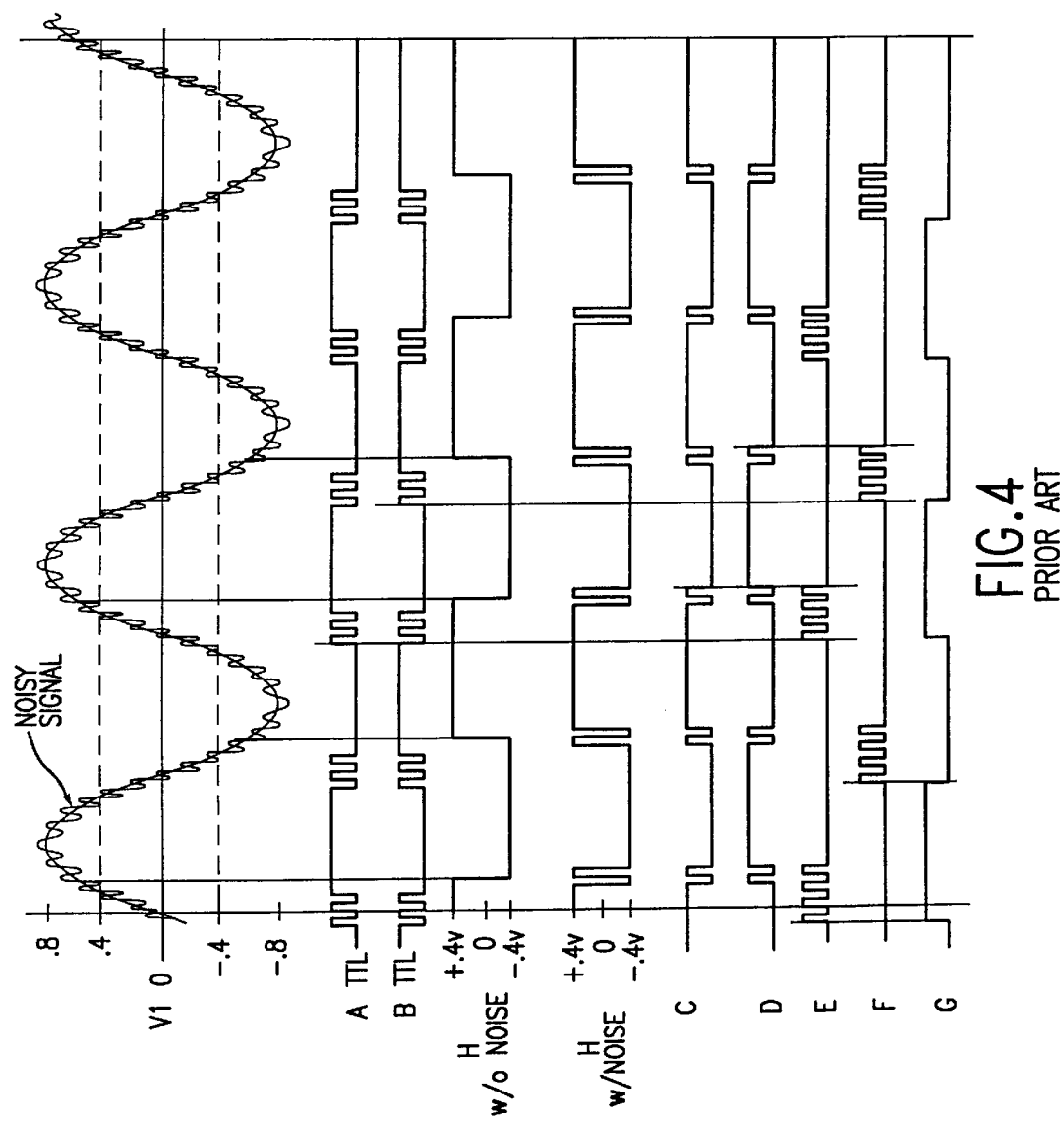
FIG. 4 is a timing diagram showing the operation of the circuit of FIG. 3.

FIG. 4 shows the signal waveforms at various points. The operation of the embodiment of FIG. 3 will be explained with reference to the FIG. 4 waveforms.

The incoming signal appears at V1. The signal is sinusoidal, having a relatively low frequency, and includes higher frequency noise, shown as a jitter. This is the same sort of input signal as shown in FIG. 1.

The noisy input signal V1 is coupled directly to circuitry for producing two signals indicating the transition of the signal V1 across two different threshold values.

The hysteresis circuitry is shown as including two differential-input, dual-output comparators U1 and U2. The input signal V1 is applied to one of the inputs of each of the comparators U1 and U2. The other input of each of the comparators is held at a reference value.

For the comparator U1, a reference value of 0 is provided at the negative input, and the input signal V1 is coupled to the positive input. Accordingly, when the input signal V1 makes a zero crossing, that is, changes from a positive to a negative value or vice versa, the comparator U1 changes state, and its dual outputs reverse values. The state change of the comparator U1 occurs at a zero crossing, regardless of the direction.

For the comparator U2, the signal V1 is coupled to the negative input. A non-zero reference voltage is provided to the positive input of the comparator U2.

Because of the non-zero reference voltage, the phase of the input signal at the time of the threshold crossing is different from the phase at a zero crossing. Because of the difference in phases, digital signals produced by the comparators U1 and U2 may be logically combined for masking, in a manner to be described below.

Any suitable, non-zero reference voltage may be used, using known circuit design techniques, to provide a hysteresis effect. However, as shown, a feedback network, including resistors R1 and R2 and a capacitor C1, are provided. Note that the output of the comparator U2, coupled to the feedback network, changes between a positive and a negative voltage as the comparator U2 changes state. Thus, the threshold voltage at the positive input of the comparator U2 is different depending on the direction of movement of the input signal V1, upward or downward.

In a particular implementation, a reference voltage of +/−0.4V is produced by the use of an emitter-coupled logic (ECL) comparator, having a peak-to-peak output voltage of 0.8V, and using the values R1=75Ω, R2=562Ω, and C1=0.22 $\mu$f.

That is, the comparator U2 switches when the input signal V1 passes 0.4V going positive, or passes −0.4V going negative.

The dual outputs of the comparators U1 and U2 are labeled A, B, C, and D, as shown. From the foregoing discussion, it will be understood that the signals A and B change state to match the zero crossings of the input signal V1. The signals C and D change state at +/−0.4V. In a desirable mode of operation where +/−0.4V is about half of the peak values of the input signal V1, this results in U2 state changes at a phase delay of approximately 30 degrees, relative to the state changes of U1.

FIG. 4 is a timing diagram which illustrates the effects of input signal jitter, and the operation of the circuit of FIG. 3. The signals A and B, and the signals C and D, are paired up with each other on adjacent lines in the timing diagram of FIG. 4, so that their opposite logic states may be seen. It is readily seen that A and B are opposite in states with each other, and likewise C and D are opposite in states with each other. This is to be expected, since the pairs of signals are output from non-inverting and inverting outputs, respectively, of the comparators U1 and U2.

Noise on the input signal V1 causes jitter on the signals A, B, C, and D, at their respective state-change points. The jitter is shown as a rapid change back and forth in state. The jitter lasts until the input signal gets far enough beyond its zero-crossing point that noise no longer causes an extra zero crossing.

Logic gates are coupled to receive the output signals of the comparators U1 and U2. The logic gates produce signals which are normally in a first state, but which briefly reach a second state as the jittery crossing points are reached. One logic gate signal reaches the second state at around the time of an upward zero crossing, and the other signal reaches the second state at around the time of the downward zero crossing.

In the implementation of FIG. 3, this result is provided as follows: the logic gates include AND gates U3 and U4. Each of the AND gates U3 and U4 receives a signal from each of the comparators U1 and U2. Specifically, the AND gate U3 receives the A signal from the comparator U1, and the C signal from the comparator U2. Likewise, the AND gate U4 receives the B signal from the comparator U1, and the D signal from the comparator U2.

Note that a phase difference between A and C on the one hand, and B and D on the other hand, may be observed. That is A's low-to-high transition occurs at a certain phase angle before C's transition from high to low. This phase difference is brought about by the hysteresis circuitry coupled to the comparator U2.

It may be said that, except for their phase difference, the signals A and C, and the signals B and D, are in opposite states with each other. That is, most of the time A is high while C is low, and vice versa.

However, because of the phase difference between the pairs of signals, and further because of their generally opposite states, when the signals are logically combined the signals mask out each other's jitter during an input signal transition in one direction, while leaving the jitter intact during the input signal transition in the other direction.

Specifically, by "ANDing" the signals A and C, a signal E is produced, and by "ANDing" the signals B and D, a signal F is produced.

Let us consider in detail the ANDing of the signals A and C to produce the signal E. During the upward movement of the input signal V1, the signal A transitions, with jitter, from low to high. Later, after the phase difference, the signal C transitions, with jitter, from high to low. Thus, for a period of time related to the phase difference, the high states of both A and C overlap, so the result of the ANDing is high (and jittery) for that period of time.

On the other hand, during the downward movement of the input signal V1, the signal A completes its jittery transition from high to low before the signal C even begins its jittery transition from low to high. Thus there is no overlap, and the signal E produced by the ANDing of A and C is low throughout this period of time.

The opposite is the case for the ANDing of the signals B and D. By applying the same sort of analysis as that given for the signals A and c, it will be seen that the result of ANDing the signals B and D is a jittery high period while they overlap during the downward movement of the input signal V1, and a steady low during the upward movement.

The non-phase-shifted and the phase-shifted signals are logically combined so that their active states overlap during an input signal movement in one direction, but do not overlap during an input signal movement in the other direction. Two such signals, E and F, are generated. Each one produces a short, jittery burst at the threshold crossing in direction of movement, and is inactive throughout the threshold crossing in the other direction of movement. The signal E remains low while the signal F goes high, and the signal F remains low while the signal E goes high.

The signals E and F are then provided to a latch U5, shown as a Set/Reset (RS) flip-flop. The signal E is provided to the SET input of the RS flip-flop U5, and the signal F is provided to the RESET input.

During the rising zero crossing of V1, when noise on V1 causes it to have multiple zero crossings rather than just one zero crossing, the RS flip-flop U5 will be set by the first rising zero crossing. Since the logic gate U4 is disabled during this time (its output, F, is held low), the RS flip-flop U5 cannot be reset. Thus G goes high just once, even though E may jitter high and low multiple times. Similarly during the falling zero crossing of V1, U3 is disabled and the first falling zero crossing resets the RS flip-flop U5, just once, even though F may jitter high and low multiple times.

The output of the RS flip-flop is shown as a signal G in the timing diagram of FIG. 4. The output G is glitch free, even though the signals E and/or F contain glitches. That is, the output G can be seen to follow the zero crossings of the waveform of V1, but without the multiple zero crossing glitches exhibited by V1.

The circuit of FIG. 3 works so long is E remains low while F is going high and jittering, and visa versa. To meet this requirement, the phase shift between the comparators U1 and U2 must be great enough, relative to the jitteriness of the logically combined comparator signals, that there is no overlap during the transition of the input signal V1. In general, the lower the amplitude of the input signal, the greater the phase difference between the comparators that will be necessary to ensure this.

Note that persons skilled in the art of logic design will recognize that logic signal concepts such as high/low, on/off, active/inactive, etc., are arbitrary, and that through judicious use of high- or low-true logic, AND or OR logic functionality, inverted or non-inverted signals, etc., many different permutations and combinations may be implemented of the general concepts illustrated here.

SYSTEM PERFORMANCE

The just-discussed implementation overcomes a drawback of the circuit taught in the U.S. Pat. No. 5,530,542 patent. Using an integrator, as taught in the '542 patent, inherently has the problem that the output level of the integrator decreases as the electrical signal frequency increases, because in general the integral of an increasingly short-wavelength function is a function of increasingly small magnitude. This decreasing magnitude can limit the useful frequency range of an integrationbased technique.

By contrast, the embodiment of FIG. 3 discussed here does not have that limitation, because the offset waveform is determined by a shift in time due to the slope of the sine wave, and thus has a magnitude which is independent of frequency.

Note that the circuit of FIG. 3 is a simplified case, in which the comparator U1 detects zero crossing in both directions, and only the comparator U2 detects crossings of voltages other than zero.

It would be possible to use a feedback network on both the comparators U1 and U2, where the circuit components have different values, suitably chosen to provide two different non-zero thresholds. Hysteresis would then be based on the differences between the threshold values, rather than on the difference between a threshold value and zero.

Note also with reference to FIG. 3 that, where the input signal is moving in a given direction, the zero crossing occurs before the crossing of the non-zero hysteresis value. Non-zero crossing before the zero crossing could be achieved by means of suitable changes to the logic connections to the gates U3 and U4, or by means of coupling the feedback network to a negative input of a comparator, rather than to the positive input of he comparator U2.

Where two different non-zero crossing thresholds are used, one could be before the zero crossing and one after, or where the crossing thresholds have different absolute magnitudes, both could be before, or both after, the zero crossing.

Note, finally, that the term "zero crossing" could be further broadened to the crossing of any phase of a sinusoidal, or otherwise periodic, signal.

PROBLEM WITH NOISE WHEN SIGNAL FREQUENCY IS HIGH

There will now be discussed a functional limitation of both the '542 patent's circuit and the implementation of FIG. 3, which is addressed in the embodiment of the invention to be described below. The limitation has to do with the frequency range of the input signal, relative to that of the noise. While the implementation of FIG. 3 effectively addresses the problem of extra detected zero crossings, there is nevertheless some susceptibility to missing zero crossings where the noise is low frequency, relative to the signal.

In the method and system described in the prior art '542 patent, an integrator is used to generate the offset signals. Because an integrator amplifies low frequencies more than high frequencies, it will amplify the low frequency content of the noise more than the high frequency noise. This causes the 90 degree offset voltages (that is, the voltages V1 and V2 in FIG. 4 of the '542 patent) to have extra low frequency noise. Hence, the effectiveness of the prior art anti-glitch circuit is reduced for the condition when the signal frequency is high and the noise frequency is relatively low, that is, the situation illustrated in FIG. 2 of the present application.

The implementation of FIG. 3 does not use an integrator, and therefore avoids the problem of frequency-selective noise amplification. However, the implementation calls for the signal to cross two different voltage thresholds, for instance the zero threshold and the 0.4V threshold.

When low-frequency noise changes the peaks of the signal as illustrated in FIG. 2, it is much easier for the noise to cause the second type of glitch (missing zero crossings), since the signal now only has to be moved (by the noise) far enough to miss one of the threshold crossings. Missing the 0.4V threshold, for instance, is just as bad as missing the zero threshold—the result at the RS Flip Flop output will be a missing zero crossing and hence a glitch.

Typically, low-frequency noise need only displace the signal about half as far, in the case of the dual-threshold embodiment of the present invention, as the signal must move to cause a missed zero crossing where the integrator circuit of the '542 patent is used.

THE INVENTION: FREQUENCY-DEPENDENT HYSTERESIS DISABLING CIRCUITRY

Accordingly, a circuit according to the invention further includes disabling circuitry for disabling the dual-signal-crossing-threshold circuitry for signal frequencies above a predetermined threshold frequency, while enabling the dualsignal-crossing-threshold circuitry to work, as described above in connection with the implementation of FIG. 3. This makes the overall anti-glitch performance better because the actual nature of the glitches is different for high frequencies versus low frequencies, as explained previously.

In a preferred class of embodiments, the disabling circuitry includes frequency dependent circuitry, such as low pass filter circuitry. To the extent that the frequency dependent circuitry affects the input signal, such as by filtering out a high frequency input signal, the disabling circuitry decreases the difference in signal crossing threshold values. Accordingly, the hysteresis effect caused by the difference in signal crossing threshold values is decreased.

Figure 5:
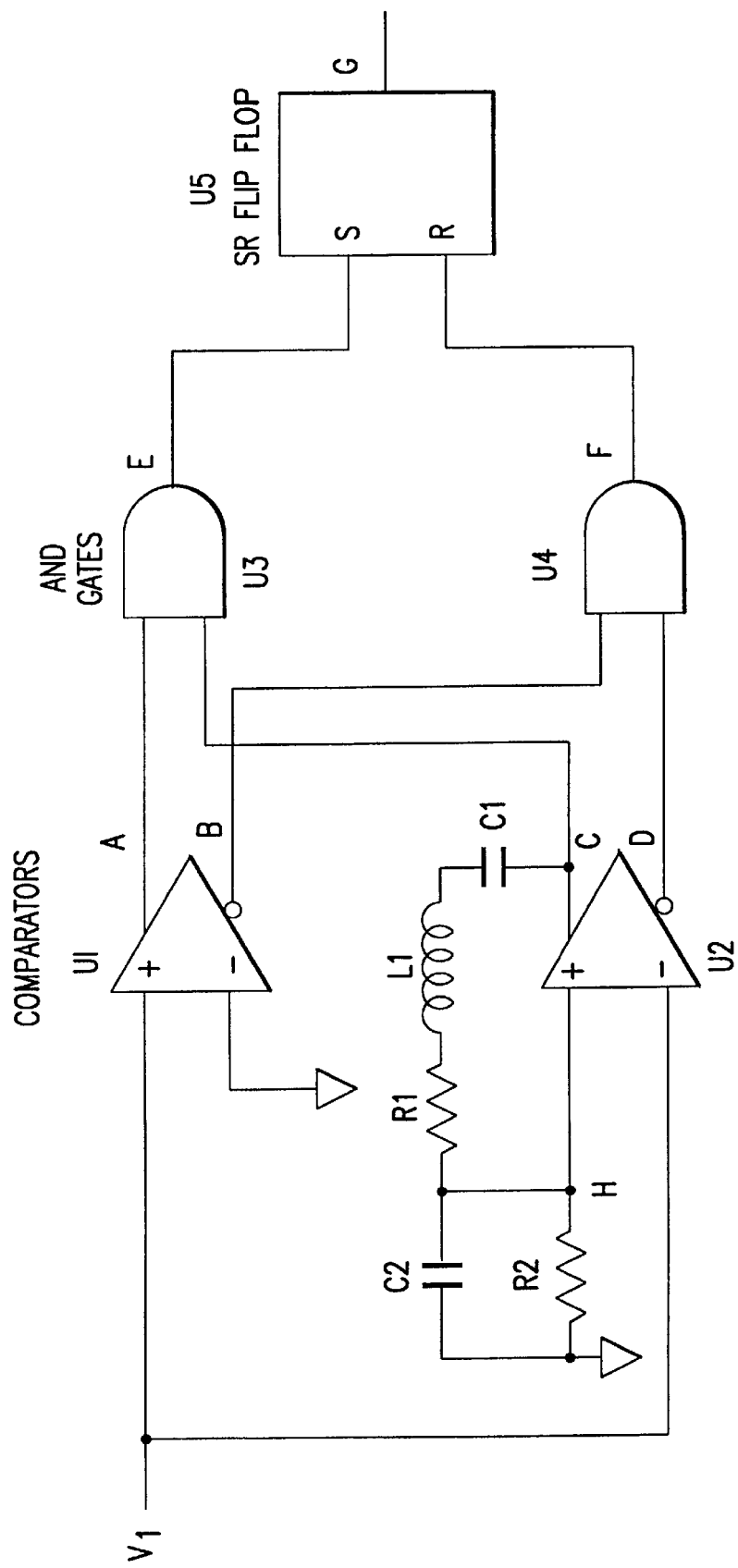
FIG. 5 is a circuit schematic diagram of a glitch control circuit according to the invention.

FIG. 5 is a schematic diagram of a preferred embodiment of the invention. The circuitry of FIG. 5 is similar to that of FIG. 3, except for changes with the feedback network components, associated with the comparator U2, which produce the hysteresis thresholds.

In the previously discussed implementation of FIG. 3, the feedback network circuit elements C1, R1 and R2, having values as stated above, interact with the comparator U2 to create, based on the two possible states of the comparator U2, the +−0.4V hysteresis voltage crossing thresholds. These voltage crossing thresholds are independent of signal frequency.

In the embodiment of the invention shown in FIG. 5, frequency-dependent circuitry is further provided, to "roll off" the hysteresis for signal frequencies above the threshold frequency. In general, the frequency-dependent circuitry is implemented using well-known filtering techniques. A given implementation of such circuitry will have a characteristic "corner frequency", whose value is related to the values of the circuit components. The corner frequency is chosen empirically, as discussed below.

FIG. 5 shows a particular preferred preferred embodiment in which the frequency-dependent circuitry includes an inductor L1 and a capacitor C2.

It has been found, empirically, that a threshold frequency of about 3.4 MHZ, used in connection with the particular circuit embodiment to be described below, works well. The components L1, R1 and C2 form a series second order low pass filter. For preferred values L1=2.2 $\mu$H and C2=1000 pF, and the values for the other components given above, the low pass filter's corner frequency is about 3.4 MHZ.

For frequencies below the threshold frequency, that is, within the pass band of the low-pass filter, the voltage swing at the output of the comparator U2 is coupled to the + input of the comparator U2, to provide, for instance, the +−0.4V hysteresis described in connection with FIG. 3. As the signal frequency increases above the threshold into the drop-off band of the low-pass filter, the filter attenuates the amplitude of the output swing provided to the + input. Because the voltages applied to the + input have values with less difference, the signal crossing thresholds move closer together. This effectively turns off the hysteresis for high frequencies.

Accordingly, the performance of the anti-glitch circuit is improved for situations where the signal frequency is high, relative to the noise frequency.

OPERATION OF THE INVENTION: FIGS. 6, 8, AND 9

Figure 6:
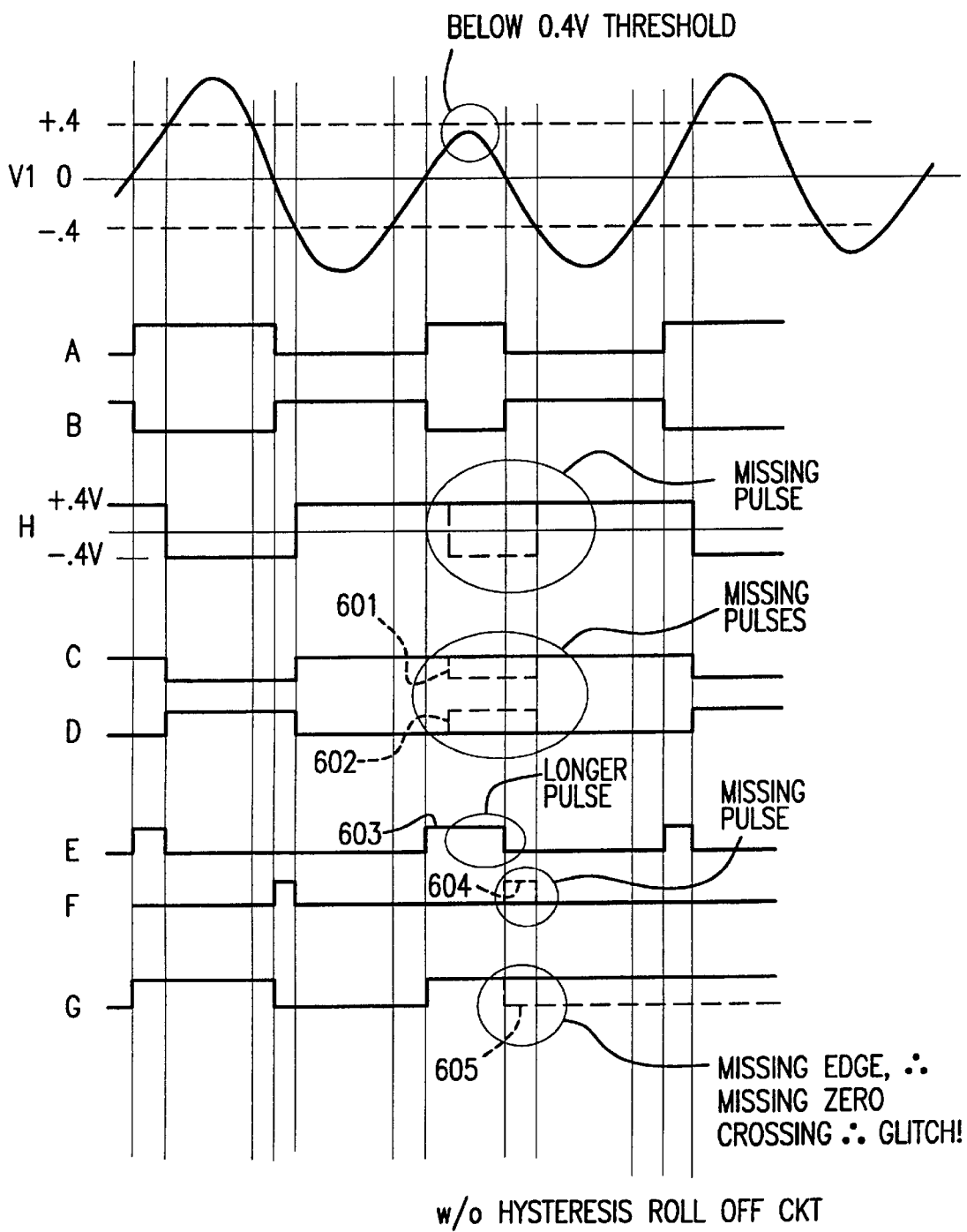
FIGS. 6, 8, and 9 are timing diagrams showing the operation of the circuit of FIG. 5.
Figure 8:
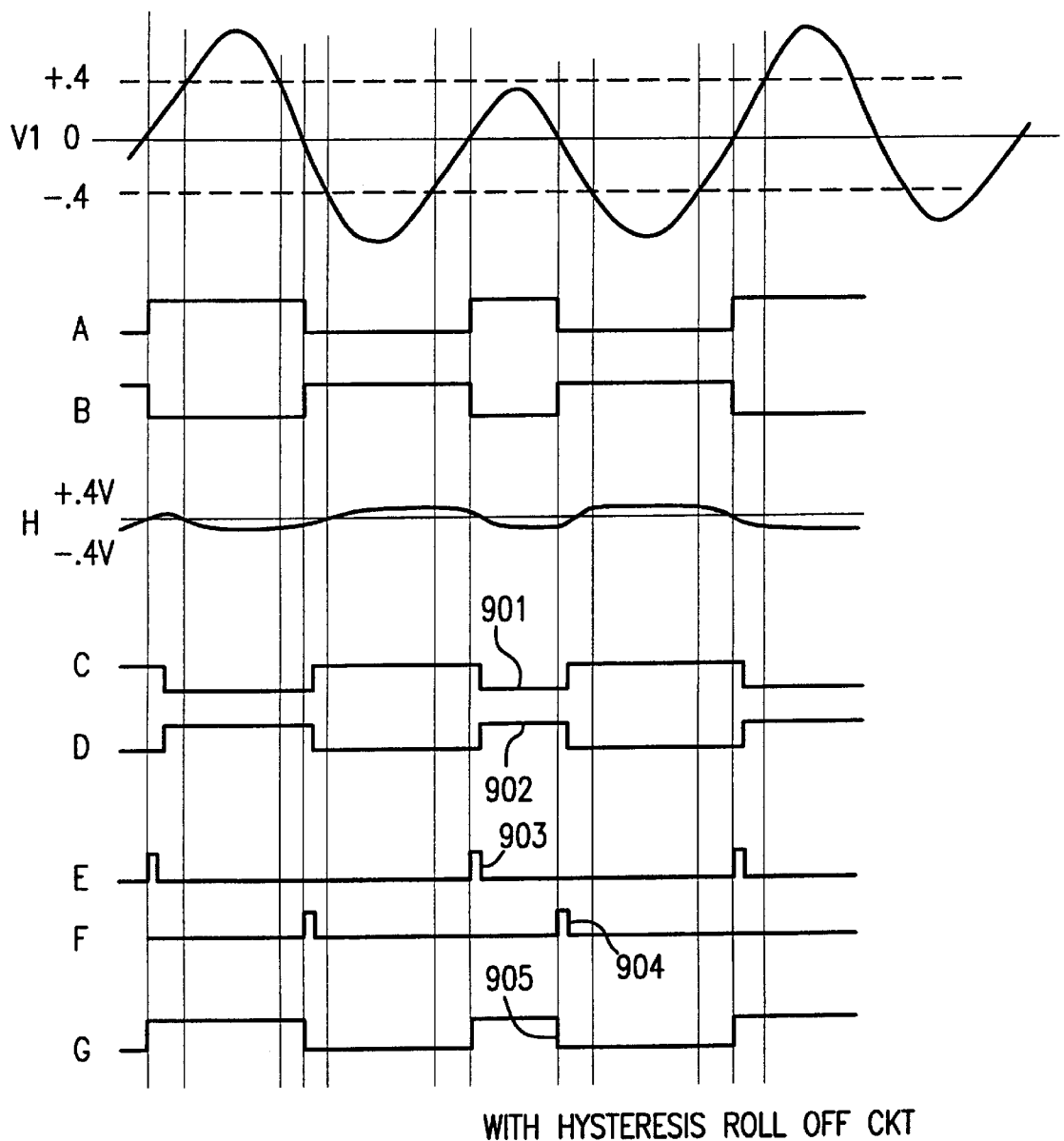
Figure 9:
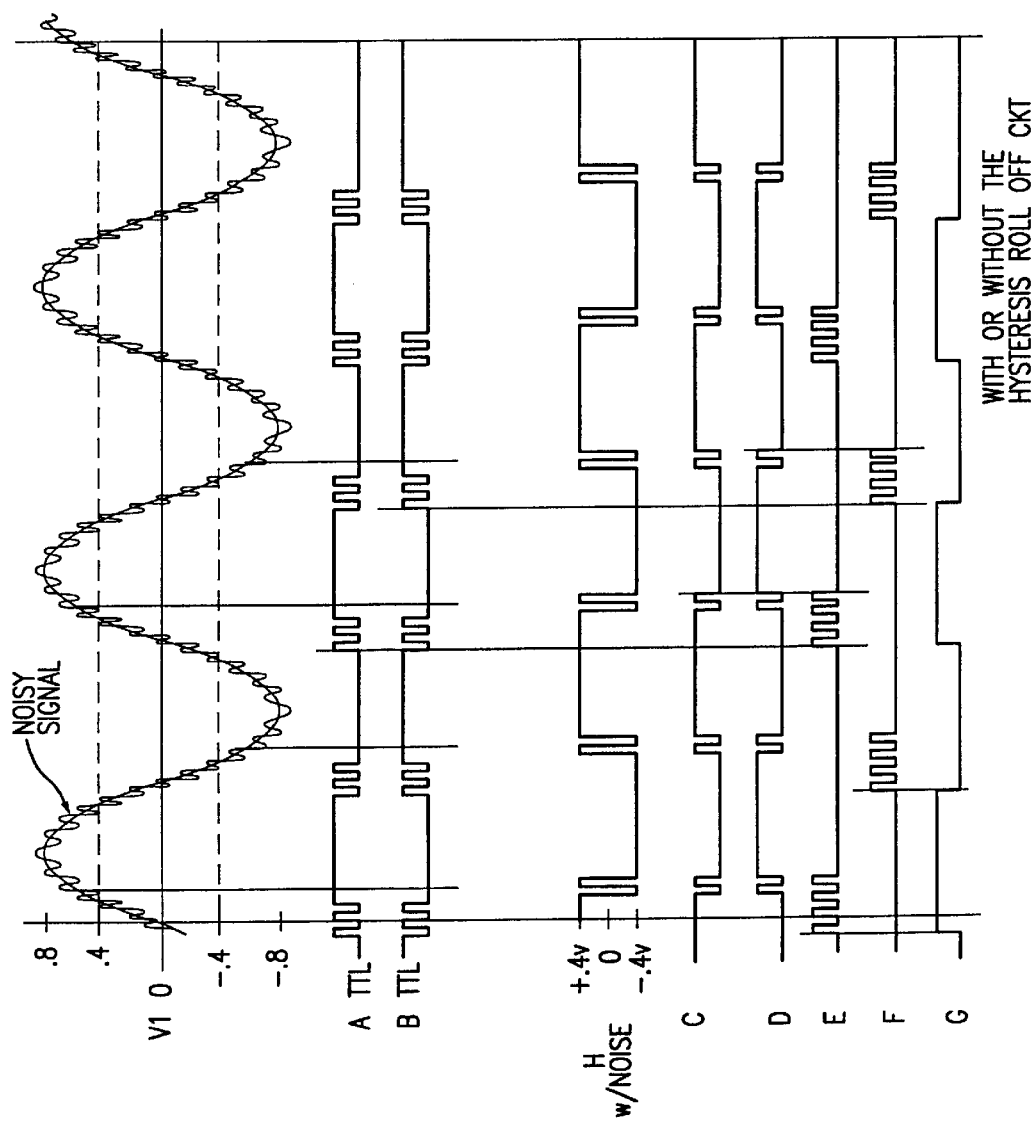

FIGS. 6, 8, and 9 are timing diagrams which, together illustrate the operation of the embodiment of FIG. 5 and its advantages over conventional systems. Signals are labeled correspondingly with those of FIG. 4. Where erroneous operation causes signals to deviate from what they should be, the correct signals are shown as dotted lines for clarity of illustration.

In FIG. 6, a system encounters noise at a low frequency, relative to that of the generally sinusoidal input signal whose frequency is above that of the corner frequency. As with FIG. 2, the low-frequency noise displaces the input signal low enough that a peak of the input signal fails to cross the upper signal crossing threshold value. Accordingly, the signals C and D fail to change state (missing pulses 601 and 602 for the signals C and D, respectively), the signal E has an excessively long pulse 603 because it is not masked inactive, and the signal F has a missing pulse 604. Therefore, the signal G fails to make a state change 605, and the result is a missing zero crossing.

Let us compare this result with that of FIG. 8, in which the same input signal, with the same low-frequency noise, is provided to a circuit with hysteresis roll-off in accordance with the invention.

In FIG. 8, the necessary pulses 901 and 902 in the signals C and D, which were missing in FIG. 6, are now present. Accordingly, the signals E and F have the appropriate short pulses 903 and 904 for each of the crossings, and the state change 605 of the signal G is not missing.

Note that where the input signal has a split frequency which is below the corner frequency, and has higher frequency noise, the result is the same regardless of whether the hysteresis roll-off circuitry of the invention is present. The operation of the FIG. 5 circuit, shown in FIG. 9, is essentially the same as the operation of the circuit of FIG. 3, as shown in FIG. 4.

The frequency roll-off circuitry may be applied to other types of glitch suppression circuit. An alternate embodiment is a modified version of the integration circuitry of FIG. 3 of the '542 patent discussed above, in which the hysteresis circuitry, with the high input frequency suppression circuitry of FIG. 5, is added.

USING LASER INTERFEROMETRY IN INTEGRATED CIRCUIT FABRICATION

Many integrated circuit (IC) dies are manufactured by producing, on a single substrate, one or more sets of electronic devices and interconnections between the devices. The devices and interconnections are laid out so as to produce the desired electronic circuit. Such an IC die is made by fabricating a succession of layers on the substrate, using photolithographic imaging techniques. Since devices and interconnections run between successive layers, each successive photolithographic image must be positioned precisely over the previous layer, so that all interconnections between the adjacent layers align properly. If the positioning is not sufficiently precise, then the resultant ICs will not work.

An apparatus, commonly called a 'wafer stepper' or "stepper," holds a semiconductor wafer in position. The term "stage" refers to a platform or holder, on the stepper, which actually holds the wafer. The stage is precisely movable, in various directions, for accurately positioning the wafer for a fabrication step.

The stepper moves the stage into position for the step of the IC fabrication process. To achieve maximum throughput, state-of-the-art steppers move wafers at speeds in excess of one meter per second. Therefore, measurement for accurate positioning must keep up with such movement. Laser interferometric measurement, in accordance with the invention, does so.

Fabrication steps such as etching, epitaxial material depositing, and photoresist image exposing, take place on the wafer thus held. For the latter type of step, the image is positioned and focused, according to the characteristics of the optical equipment used to project it. The die must be positioned precisely, relative to the image.

To achieve the required precise positioning, laser interferometer measurement systems are used. A reflector is positioned in association with the die wafer being fabricated. Preferably, the reflector is glued or otherwise affixed to the wafer stepper stage upon which the die sits. Any suitable type of reflector, such as a cube corner type reflector, may be used, although a wide, very flat, planar mirror type reflector is preferred. Multiple reflectors are used, along with multiple measurement beams, for positioning the die on different coordinate axes.

A laser light beam is directed through the optical interferometer toward the reflector. The light travels along a path whose length is related to the positioning of the stage bearing the wafer, relative to the photolithographic image, such that the path length changes as the wafer is moved toward or away from its desired location.

As IC production requirements continue to increase, the demands on steppers have also increased. Larger wafer runs require steppers with higher wafer throughput. Laser interferometers used in such systems must then be able to operate over a wider frequency range, since the steppers must operate at higher velocities. A receiver that can operate over a wider frequency range must have a wider bandwidth. This wider bandwidth receiver will exhibit more noise, further complicating the zero crossing detection problem.

With complex steppers, it is desirable to split the light beam as many times as possible. Therefore an improvement in the sensitivity of the receiver reduces the cost of the stepper. Because of the glitch reduction brought about by the invention, an advantageously large number of light signals may be split off from the source. The cost of the resulting wafer stepper is thus advantageously reduced. Also, the measurement system according to the invention is able to resolve differences in phase between the measurement and reference signals during advantageously high stage velocities. This results in more efficient positioning.

Also, the speed at which the wafer is positioned for a fabrication step plays a part in determining the overall efficiency of the fabrication process. The measurement system of the invention is able to resolve differences in phase between the measurement and reference signals during higher stage velocities than can be done conventionally.

What is claimed is:

1. A glitch reduction circuit for detecting threshold crossings in an input signal, the input signal including information and noise, the circuit comprising:
    a hysteresis circuit including:
        (I) a first hysteresis element coupled to receive the input signal, the first hysteresis element including means for producing a first signal which changes to a first value when the input signal crosses a first threshold in one direction, and changes to a second value when the input signal crosses a second threshold in a direction opposite to the first direction,
        (ii) a second hysteresis element coupled to receive the input signal, the second hysteresis element including means for producing a second signal which changes to the first value when the input signal crosses a third threshold in a first direction, and changes to the second value when the input signal crosses a fourth threshold in a direction opposite to the first direction,
        (iii) feedback network, coupled to the second element for setting the third and fourth thresholds to values different, respectively, from the first and second thresholds, and
        (iv) frequency dependent circuitry, coupled to said feedback network, for changing the third and fourth threshold values based on a frequency of the input signal;
    mask logic circuitry, coupled to receive the signals from the first and second hysteresis elements and including circuitry (a) for producing a first latch input signal which is active during a transition of the input signal in the first direction and inactive otherwise, and (b) for producing a second latch input signal which is active during a transition of the input signal in the second direction and inactive otherwise; and
    a latch having a first and second states, the latch including means for entering the first state responsive to the first latch input signal, and for entering the second state responsive to the second latch input signal, the latch further including an output for providing an output signal reflective of whether the latch is in the first or second state, respectively, the output signal being indicative of detection of a threshold crossing.

2. A glitch reduction circuit as recited in claim 1, wherein the first and second thresholds are the same value.

3. A glitch reduction circuit as recited in claim 2, wherein the first and second thresholds are both zero.

4. A glitch reduction circuit as recited in claim 1, wherein the feedback network is coupled to the second hysteresis element to provide the second hysteresis element with a first feedback value when the second hysteresis element is in a first state and a second feedback value when the second hysteresis element is in a second state, the first and second feedback values being related to the third and fourth thresholds, respectively.

5. A glitch reduction circuit as recited in claim 1, wherein the first and second hysteresis elements include, respectively, a first and a second differential-input comparator.

6. A glitch reduction circuit as recited in claim 5, wherein the feedback network is coupled between an output of the second differential-input comparator and one of the inputs thereof, to provide the second differential-input comparator with a first feedback value when the second differential-input comparator is in a first state and a second feedback value when the second differential-input comparator is in a second state, the first and second feedback values being related to the third and fourth thresholds, respectively.

7. A glitch reduction circuit as recited in claim 5, wherein the first and second differential-input comparators each have dual, opposite polarity outputs.

8. A glitch reduction circuit as recited in claim 7, wherein the mask logic circuitry includes first and second logic gates, each of the first and second logic gates having first and second inputs, the first logic gate having an output coupled to the latch to provide the first latch input signal thereto, and the second logic gate having an output coupled to the second input of the latch to provide the second latch input signal thereto.

9. A glitch reduction circuit as recited in claim 8, wherein, for the first logic gate, the first and second inputs are coupled, respectively, to one of the outputs of each of the first and second differential-input comparators, and for the second logic gate, the first and second inputs are coupled, respectively, to the other of the outputs of each of the first and second differential-input comparators.

10. A glitch reduction circuit as recited in claim 1, wherein the frequency dependent circuitry includes circuitry for producing third and fourth thresholds whose respective differences between the first and second thresholds decrease as the frequency of the input signal increases.

11. A glitch reduction circuit as recited in claim 10 wherein:
   the frequency dependent circuitry includes low pass filter circuitry; and
   the respective differences decrease in relation to filtering of the input signal by the low pass filter circuitry.

* * * * *